United States Patent [19]
Philpott

[11] Patent Number: 6,121,810
[45] Date of Patent: Sep. 19, 2000

[54] INTEGRATED DELAY LINE CALIBRATION METHOD AND APPARATUS FOR DIRECT ACCESS STORAGE DEVICE (DASD)

[75] Inventor: Rick A. Philpott, Rochester, Minn.

[73] Assignee: International Business Machines Corporation, Armonk, N.Y.

[21] Appl. No.: 09/167,057

[22] Filed: Oct. 6, 1998

[51] Int. Cl.[7] .................................................. H03H 11/26
[52] U.S. Cl. ........................ 327/270; 327/244; 327/243; 360/65; 375/371
[58] Field of Search ..................................... 327/243, 244, 327/250, 252, 253, 237, 159, 270; 395/558; 375/371; 331/1 A; 360/55

[56] References Cited

U.S. PATENT DOCUMENTS

| | | | |
|---|---|---|---|
| 5,087,842 | 2/1992 | Pulsipher et al. | 327/270 |
| 5,382,921 | 1/1995 | Estrada et al. | 327/159 |
| 5,396,130 | 3/1995 | Galbraith et al. | 327/534 |
| 5,696,951 | 12/1997 | Miller | 395/558 |
| 5,878,097 | 3/1999 | Hase et al. | 375/371 |

*Primary Examiner*—Dinh T. Le
*Attorney, Agent, or Firm*—Joan Pennington

[57] ABSTRACT

An integrated delay line calibration method and apparatus are provided for a direct access storage device (DASD). A delay line, such as used in a direct access storage device (DASD) is calibrated by configuring the delay line as a ring oscillator for calibration. A delay line ring frequency is compared to a reference frequency. The delay of the delay line is adjusted until the delay line ring frequency and the reference frequency are equal. Each delay block within the delay line is controlled by a delay adjust digital-to-analog converter (DAC). A control logic circuit couples N-bit words to the delay adjust digital-to-analog converter (DAC) for calibration adjustment of the delay line delay.

13 Claims, 3 Drawing Sheets

INTEGRATED DELAY LINE CALIBRATION METHOD AND APPARATUS FOR DIRECT ACCESS STORAGE DEVICE (DASD)

FIELD OF THE INVENTION

The present invention generally relates to the data processing field, and more particularly to, an integrated delay line calibration method and apparatus for a direct access storage device (DASD).

DESCRIPTION OF THE RELATED ART

Direct access storage devices (DASDs) often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Typically servo information is provided on one or more disk surfaces for reading by the transducer heads for accurately and reliably positioning transducer heads on the disk surfaces to read and write data.

Currently delay lines are used in read/write channels for the write precompensation function. Write precomp requires tight tolerances of each delay block. Integrated delay lines are built using delay circuits or blocks that have a finite amount of delay. The amount of delay is sensitive to technology or process variations. These variations cause the amount of delay to have large tolerances which can result in performance loss.

Various methods exist to calibrate the delay. One method measures the amount of time it takes a signal to propagate through the delay line. Another method inverts the output and connects the inverted output to the input which makes the delay line function as a ring oscillator which oscillates at a frequency dependent on the number of delay blocks and the amount of delay in each block.

A significant problem with both of these schemes is that the propagation delay or the ring frequency needs to be measured externally to the integrated circuit chip. Measuring delays in time (nanosecond or picosecond) is very difficult and not very accurate. Measuring frequencies is easier and can be performed using an external frequency counter. The use of an external frequency counter makes it impossible to build a completely integrated on chip delay line calibration scheme.

Typically the delay is trimmed by blowing fuses. For example, U.S. Pat. No. 5,396,130, issued Mar. 7, 1995 to Galbraith et al. and assigned to the present assignee, discloses a method and apparatus for adaptive chip trim adjustment using permanent switching elements or fuses.

A need exists for an improved integrated delay line calibration method and apparatus for a direct access storage device (DASD). It is desirable to provide such integrated delay line calibration method and apparatus that eliminates the need for external test equipment. It also is desirable to provide such integrated delay line calibration method and apparatus that eliminates the need for the fuses and the fuse blowing process at wafer test.

SUMMARY OF THE INVENTION

A principal object of the present invention is to provide an improved integrated delay line calibration method and apparatus for a direct access storage device (DASD). Other important objects of the present invention are to provide such method and apparatus substantially without negative effects; and to provide such method and apparatus that overcome some of the disadvantages of prior art arrangements.

In brief, an integrated delay line calibration method and apparatus are provided for a direct access storage device (DASD). A delay line, such as used in a direct access storage device (DASD) is calibrated by configuring the delay line as a ring oscillator. A delay line ring frequency is compared to a reference frequency for calibration. The delay of the delay line is adjusted until the delay line ring frequency and the reference frequency are equal.

In accordance with features of the invention, each delay block within the delay line is controlled by a delay adjust digital-to-analog converter (DAC). A control logic circuit couples N-bit words to the delay adjust digital-to-analog converter (DAC) for calibration adjustment of the delay line.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
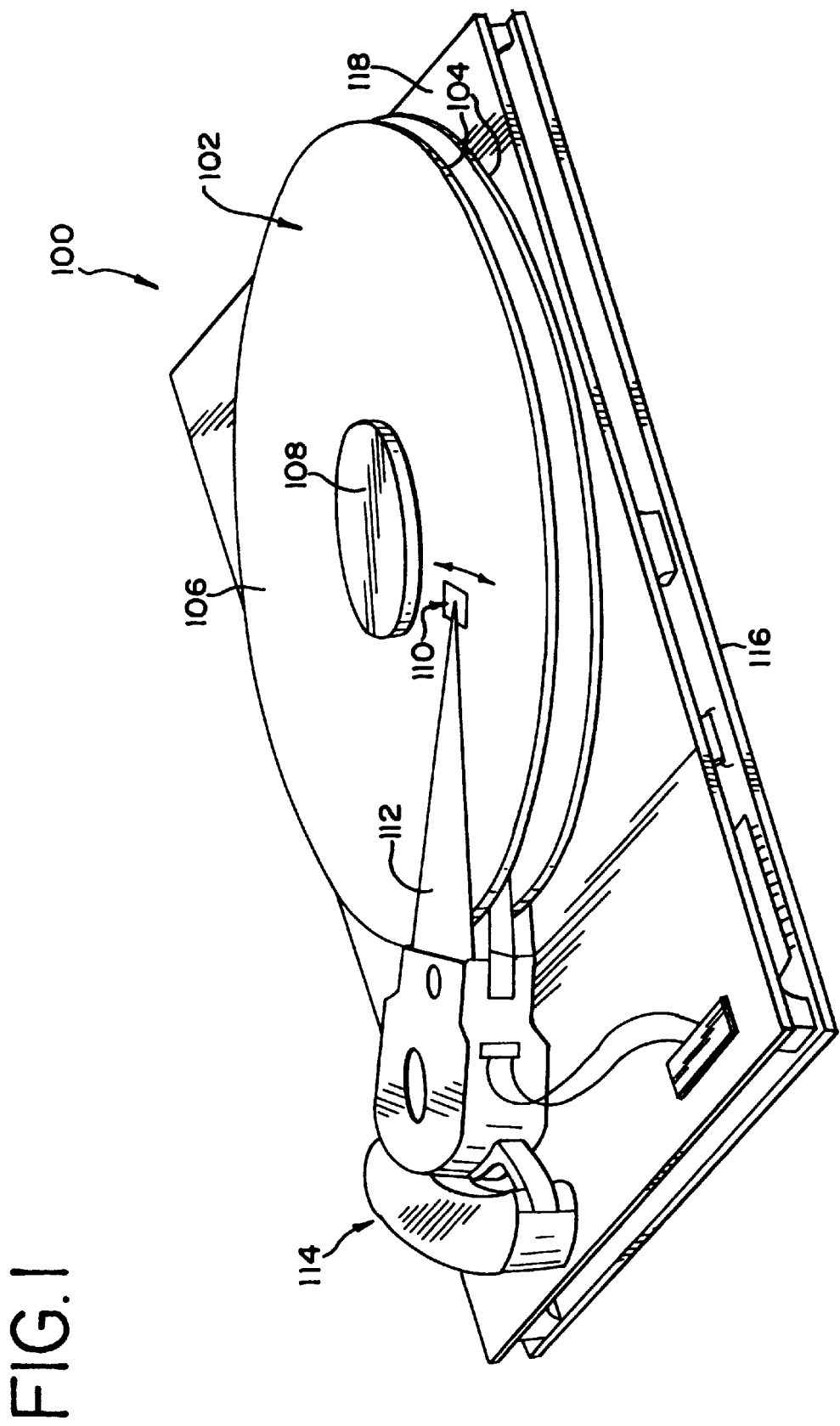
FIG. 1 is a diagrammatic view of a direct access storage device (DASD) embodying the present invention.

Having reference now to the drawings, in FIG. 1 there is illustrated a direct access data storage device (DASD) generally designated as 100 including a stack 102 of disks 104 each having at least one magnetic surface 106. The disks 104 are mounted parallel to one another for simultaneous rotation on and by an integrated spindle and motor assembly 108. Information on each magnetic disk surface 106 is read from or written to the disk surface 106 by a corresponding transducer head assembly 110 movable in a path having a radial component across the rotating disk surface 106.

Each transducer head assembly 110 is carried by an arm 112. The arms 112 are ganged together for simultaneous pivotal movement by a voice coil motor (VCM) magnet assembly 114. Drive signals applied to the VCM magnet assembly 114 cause the arms 112 to move in unison to position the transducer head assemblies 110 in registration with information storage tracks on the disk surfaces 106 where information is written or read. As shown in FIG. 1, an electronics card 116 is mounted together with a base support 118 of DASD 100. The utility of the present invention is not restricted to the details of a particular DASD construction.

Figure 2:
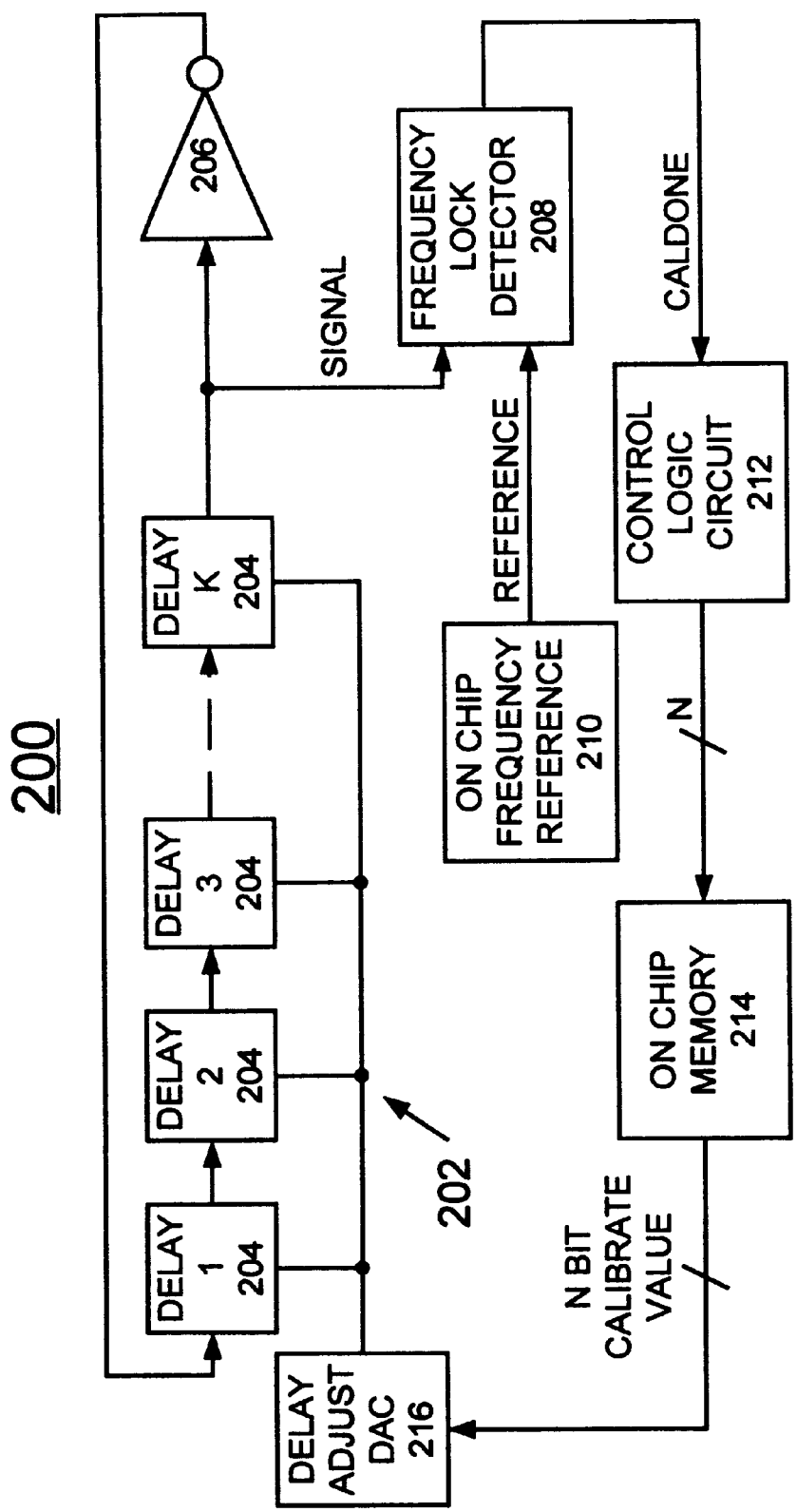
FIG. 2 is a schematic and block diagram representation of an integrated delay line calibration apparatus of the preferred embodiment included in the direct access storage device (DASD) of FIG. 1.

Referring now to FIG. 2, there is shown a schematic and block diagram of a read/write channel integrated delay line calibration apparatus 200 of the preferred embodiment. In accordance with features of the invention, read/write channel integrated delay line calibration apparatus 200 of the preferred embodiment is available in the DASD 100 so that the need for any external circuitry or external test equipment is eliminated. A delay line generally designated 202 includes a plurality of delay stages 204. As shown in FIG. 2, the delay line 202 is made up of K stages 204. Each delay stage 204 has a unit time delay of T. The time it takes for a signal to propagate through the delay line is Tprop=(K×T). The unit time delay (T) of each stage 204 is a variable that is sensitive to technology or process variations. Such variations cause the amount of delay (T) to have large tolerances which result in large tolerances in Tprop.

In accordance with features of the invention, a calibration method is provided to calibrate out the tolerance in each unit delay (T). In the read/write channel integrated delay line calibration apparatus 200 of the preferred embodiment, an inverter 206 is coupled between the last delay stage (K) 204 and the first delay stage (1) 204. Connecting the inverted output of the delay line 202 to its input causes the delay line 202 to function as a ring oscillator with a ring frequency of:

$$F\text{ring}=1/(2*T\text{prop})=1/(2*K*T).$$

The output from the delay line 202 is coupled to an input of a frequency lock detector 208 as indicated at a line labeled SIGNAL. An on chip frequency reference source 210 provides a reference input to the frequency lock detector 208 indicated at a line labeled REFERENCE. The frequency lock detector 208 compares the frequency on the SIGNAL input from the delay line 202 to the frequency on the REFERENCE input. When the frequency on the SIGNAL input equals the frequency on the REFERENCE input the output of the frequency lock detector 208 indicated at a line labeled CALDONE goes high. The on chip frequency reference source 210 providing the REFERENCE input can be an on chip Phase Locked Loop or generally any kind of clock generator.

Integrated delay line calibration apparatus 200 includes a control logic circuit 212 coupled to an on chip memory 214. The control logic circuit 212 is suitably programmed to execute the calibration method of the preferred embodiment as illustrated and described with respect to the flowchart of FIG. 3. The delay time (T) of each delay block is controlled by a delay adjust digital-to-analog converter (DAC) 216. Delay adjust DAC 216 receives an N-bit word that is generated by the control logic circuit 212 and held in the memory block 214. To calibrate the delay line 202, the control logic circuit 212 will adjust the N-bit word until the frequency on the SIGNAL input equals the frequency on the REFERENCE input at which time the CALDONE signal will go high. The N-bit word is held in the on chip memory block 214 which allows the control logic circuit 212 to be used to calibrate other analog circuits (not shown).

Figure 3:
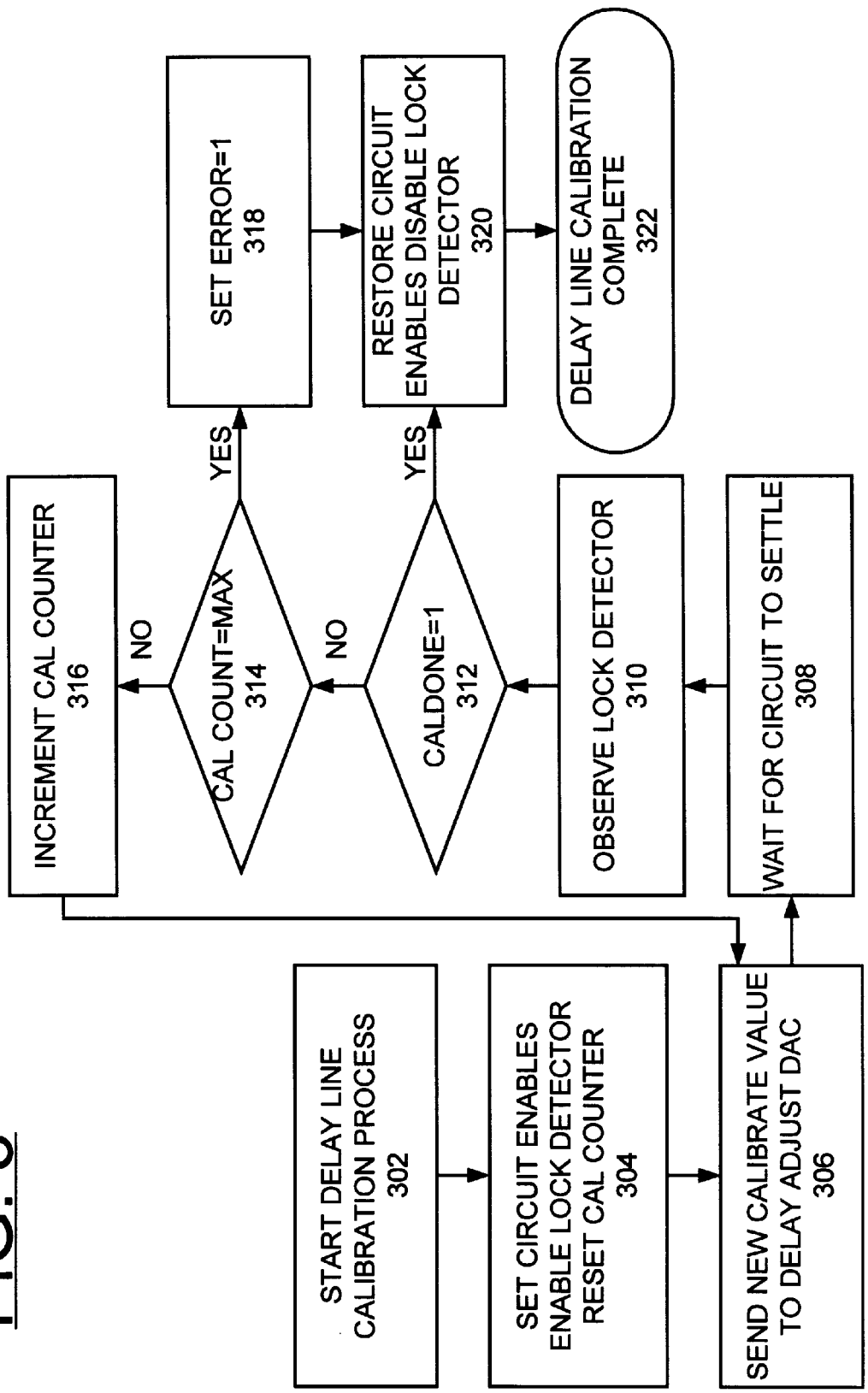
FIG. 3 is a flow chart illustrating exemplary sequential operations of a delay line calibration method of the preferred embodiment.

Referring now to FIG. 3, exemplary sequential steps for calibrating the delay line 202 are shown. In brief, the delay line 202 is calibrated by connecting it into a ring oscillator as shown in FIG. 2, and comparing the delay line ring frequency to a reference frequency generated by the reference frequency source 210. The delay line calibration method begins as indicated at a block 302. Circuit enables are set, the frequency lock detector 208 is enabled and a calibration counter function of the control logic circuit 212 is reset as indicated at a block 304. A new calibrate value is sent to the delay adjust DAC 216 by the control logic circuit 212 as indicated at a block 306. A delay is provided to allow the integrated delay line calibration apparatus 200 time to settle as indicated at a block 308. The lock detector 208 is checked as indicated at a block 310. Then it is determined whether the CALDONE signal output of the lock detector 208 is high as indicated at a decision block 312. When the CALDONE signal output is not high at block 312, then the calibration count is compared to a maximum value. If the calibration count is not equal to the maximum value, then the calibration counter is incremented as indicated at a block 316. Then the sequential operations return to block 306 to send the new calibrate value. If the calibration count is equal to the maximum value, then an error is set as indicated at a block 318.

When the CALDONE signal output is high at block 312, then the delay line ring frequency is equal to the reference frequency. After frequency lock detector 208 outputs a high signal when the frequencies are equal or after an error is set at block 318, the circuit enables are restored and the lock detector 208 is disabled as indicated at a block 320. The calibration process is completed as indicated at a block 322.

While the present invention has been described with reference to the details of the embodiments of the invention shown in the drawing, these details are not intended to limit the scope of the invention as claimed in the appended claims.

What is claimed is:

1. A method for calibrating a delay line of a read/write channel integrated delay line calibration apparatus in a direct access storage device (DASD) comprising the steps of:

configuring the delay line as a ring oscillator for calibration; the delay line including a plurality of delay blocks;

comparing a delay line ring frequency to a reference frequency, and adjusting a delay of the delay line until said delay line ring frequency and said reference frequency are equal; said delay adjusting step including the steps of generating an N-bit calibrate value, and applying said generated N-bit calibrate value to a delay adjust digital-to-analog converter (DAC) coupled to the delay line for calibration adjustment of the delay line and controlling a delay of each said delay block within the delay line by said delay adjust digital-to-analog converter (DAC).

2. The method for calibrating a delay line of a read/write channel integrated delay line calibration apparatus as recited in claim 1 wherein the step of configuring the delay line as said ring oscillator includes the step of connecting an inverter between a last delay block and a first delay block in the delay line for providing an inverted output of the delay line to an input of the delay line.

3. The method for calibrating a delay line of a read/write channel integrated delay line calibration apparatus as recited in claim 2 further includes the steps of enabling a frequency lock detector.

4. The method for calibrating a delay line of a read/write channel integrated delay line calibration apparatus as recited in claim 3 wherein the step of comparing said delay line ring frequency to said reference frequency for calibration includes the steps of applying an output of said delay line to an input of said frequency lock detector and applying a reference frequency input to said frequency lock detector, and wherein said frequency lock detector generates a high output responsive to said delay line ring frequency and said reference frequency being equal.

5. The method for calibrating a delay line of a read/write channel integrated delay line calibration apparatus as recited in claim 1 includes the step of providing a control logic circuit for generating said N-bit calibrate value and for applying said generated N-bit calibrate value to said delay adjust digital-to-analog converter (DAC).

6. The method for calibrating a delay line of a read/write channel integrated delay line calibration apparatus as recited in claim 1 includes the steps of comparing said generated N-bit calibrate value with a predefined maximum value, and generating an error signal responsive to said generated N-bit calibrate value equal to said predefined maximum value.

7. The method for calibrating a delay line of a read/write channel integrated delay line calibration apparatus as recited in claim 6 further includes the step of responsive to generating said error signal, disabling a frequency lock detector.

8. The method for calibrating a delay line of a read/write channel integrated delay line calibration apparatus as recited in claim 1 further includes the step of responsive to said delay line ring frequency and said reference frequency being equal, disabling a frequency lock detector used for comparing said delay line ring frequency and said reference frequency.

9. A read/write channel integrated delay line calibration apparatus for calibrating a delay line in a direct access storage device (DASD) comprising:

means for configuring the delay line as a ring oscillator for calibration; the delay line including a plurality of delay blocks;

a frequency lock detector coupled to an output of the delay line and to a reference frequency input for comparing a delay line ring frequency to a reference frequency, a delay adjust digital-to-analog converter (DAC) for adjusting a delay of the delay line until said delay line ring frequency and said reference frequency are equal;

control logic circuit for coupling a calibrate value to said delay adjust digital-to-analog converter (DAC); said control logic circuit coupled to said frequency lock detector for identifying when said delay line ring frequency and said reference frequency are equal; and said control logic circuit for coupling a generated N-bit calibrate value to said delay adjust digital-to-analog converter (DAC) for calibration adjustment of the delay line and means for controlling a delay of each said delay block within the delay line by said delay adjust digital-to-analog converter (DAC).

10. The read/write channel integrated delay line calibration apparatus for calibrating a delay line as recited in claim 9 further includes a memory coupled to said control logic circuit for storing said calibrate value.

11. The read/write channel integrated delay line calibration apparatus for calibrating a delay line as recited in claim 9 further includes an inverter connecting between a last delay block and a first delay block in the delay line for providing an inverted output of the delay line to an input of the delay line for configuring the delay line as said ring oscillator for calibration.

12. A direct access storage device DASD including a data channel, said DASD comprising:

at least one disk mounted for rotation about an axis and having at least one disk surface for storing data;

transducer means mounted for movement across said disk surface for reading and writing data to said disk surface;

a read/write channel integrated delay line calibration apparatus including;

a delay line; said delay line including a plurality of delay block;

means for configuring the delay line as a ring oscillator for calibration;

a frequency lock detector coupled to an output of the delay line and to a reference frequency input for comparing a delay line ring frequency to a reference frequency, a delay adjust digital-to-analog converter (DAC) for adjusting a delay of the delay line until said delay line ring frequency and said reference frequency are equal; and a control logic circuit for coupling a calibrate value to said delay adjust digital-to-analog converter (DAC); said control logic circuit coupled to said frequency lock detector for identifying when said delay line ring frequency and said reference frequency are equal and a memory coupled to said control logic circuit for storing said calibrate value applied to said delay adjust digital-to-analog converter (DAC); and means for controlling a delay of each said delay block within the delay line by said delay adjust digital-to-analog converter (DAC).

13. The direct access storage device DASD as recited in claim 12 further includes an inverter connecting between a last delay block and a first delay block in the delay line for providing an inverted output of the delay line to an input of the delay line for configuring the delay line as said ring oscillator for calibration.

* * * * *